R. MANSFIELD.
BALANCING DEVICE FOR SCALE BEAMS.
APPLICATION FILED JUNE 3, 1911.
1,012,262.
Patented Dec. 19, 1911.
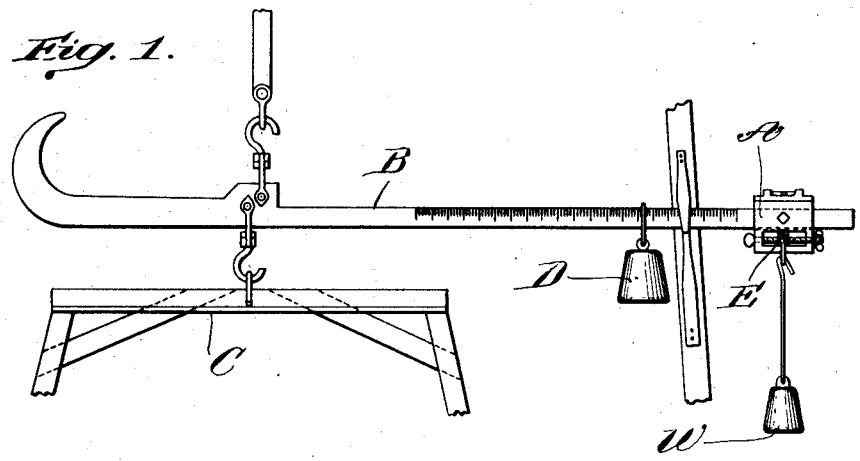
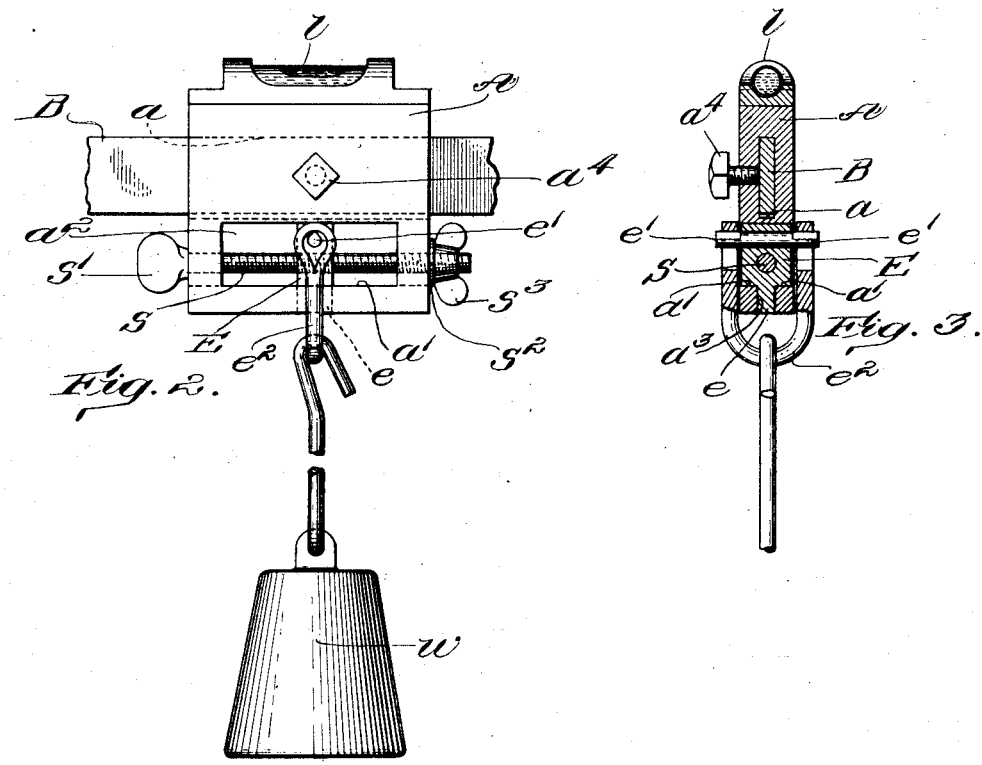
Witnesses:
Josephine H. Ryan
Charles D. Woodbury
Inventor:
Roger Mansfield.
by Roberts Roberts & Cushman
Attys

UNITED STATES PATENT OFFICE.

ROGER MANSFIELD, OF BOSTON, MASSACHUSETTS.

BALANCING DEVICE FOR SCALE-BEAMS.

1,012,262.  Specification of Letters Patent.  Patented Dec. 19, 1911.

Application filed June 3, 1911. Serial No. 631,035.

*To all whom it may concern:*

Be it known that I, ROGER MANSFIELD, a citizen of the United States, and resident of Boston, in the county of Suffolk and State of Massachusetts, have invented new and useful Improvements in Balancing Devices for Scale-Beams, of which the following is a specification.

This invention relates to scales of the class employing scale beams, and consists in an adjustable balancing device, convenient to operate and capable of exceedingly fine and accurate adjustment.

For the purpose of illustration, I will describe the device in connection with the scale beam of large scales such as are employed in warehouses, wharves, &c., for weighing heavy materials in bulk, but it will be understood that the invention is equally applicable to other forms of scale beams.

The principal object of the invention is to provide an improved, adjustable balancing device attachable to the scale beam, by which the scale beam may be brought to perfect balance when empty, or when supporting an empty carrier or container for the materials to be weighed, so that the reading of the scale shall at once give the correct weight of the materials without making it necessary to take account of the tare, or allowance for the weight of the carrier or container.

The invention finds a large field of usefulness in sugar refineries, warehouses, and similar situations where it is customary in carrying materials on trucks from one place to another, as from the vessel whence it is unloaded to the place of storage, to weigh the material on the truck by rolling the truck with its load directly on to the scale platform, and the invention will be described in connection with a scale beam for such use.

In the accompanying drawings which illustrate the invention,—Figure 1 is a side view of a scale beam and an adjustable balancing device embodying the invention; Fig. 2 is a side view, enlarged, showing the balancing device; and Fig. 3 is a vertical section through the center of Fig. 2.

The scale beam B, the frame C for supporting the scale platform or scale pan, and the weight D for weighing the goods, may all be of usual and well known construction.

My improved balancing device comprises a hanger in the form of a block A made with a lengthwise extending slot $a$ through which the scale beam B passes. The slot $a$ makes a reasonably close sliding fit with the scale beam, and the block A is preferably applied to the beam near its end as shown in Fig. 1. In the block A below the beam are slideways $a'$, $a'$, extending lengthwise of the beam above which slideways is the transverse slot or aperture $a^2$ opening through both sides of the block. A slot $a^3$ may be provided in the bottom of the block. A slide E is supported on said slideways, and is adjustable thereon lengthwise of the beam. The slide E is made with the downwardly extending tongue $e$, which projects into the slot $a^3$ and holds the slide in proper position on the slideways, and is also provided with a screw threaded bore extending lengthwise of the scale beam, through which passes the adjusting screw $s$. The adjusting screw $s$ turns in the block A, and is made with the flattened head $s'$, which abuts against one end of the block, the other end of the screw projecting through the other end of the block, where a washer $s^2$ and thumb nut $s^3$ are provided to clamp the screw in adjusted position. At either side of the slide E project a pair of studs $e'$, the upper sides of which are made with sharp edges, from which is supported the bail or loop $e^2$. The weight W is suspended from the loop $e^2$.

When the truck or other carrier or container is placed empty on the scale platform, the block A is moved lengthwise until the scale beam is roughly or approximately balanced. Then the set screw $a^4$ is set up tight against the scale beam to clamp the block stationary thereon. To obtain a very fine and accurate adjustment and perfect balance, the thumb nut $s^3$ is loosened and the screw $s$ is turned by the head $s'$ to shift the slide E in either desired direction, thereby adjusting the weight W lengthwise of the beam. After the proper adjustment is obtained, the thumb nut $s^3$ is set up again and secures the slide in adjusted position against accidental movement. To facilitate bringing the scale beam to a perfectly balanced and level position, the block A may be provided if desired with a spirit level $l$. Thus it will be seen that the scale beam may easily and accurately be brought to a position of perfect balance with the truck or other carrier or container on the scale platform, and set for such carrier or container of given weight, and the reading of the scale will give the weight of the goods so long as carriers or containers of uniform weight are used.

I claim:

1. An adjustable balancing device for scale beams comprising a block adapted to be adjustably mounted on a scale beam, means to clamp said block to the scale beam, said block having slideways, a slide supported by said slideways and adjustable thereon, a screw threaded through said slide and turning in said block to move the slide on said slideways, said block having openings in its sides and a slot in its bottom, a tongue on said slide extending into said slot, a pair of sharp edge studs extending from said slide through said side openings, and a weight suspended from said studs.

2. An adjustable balancing device for scale beams comprising a block adapted to be adjustably mounted on a scale beam, means to clamp said block to the scale beam, said block having slideways, a slide supported by said slideways and adjustable thereon, a screw threaded through said slide and turning in said block to move the slide on said slideways, said block having openings in its sides, a pair of sharp edge studs extending from said slide through said side openings, and a weight suspended from said studs.

Signed by me at Boston, Massachusetts this 29th day of May 1911.

ROGER MANSFIELD.

Witnesses:
ROBERT CUSHMAN,
CHARLES D. WOODBERRY.

---

Copies of this patent may be obtained for five cents each, by addressing the "Commissioner of Patents, Washington, D. C."